(12) United States Patent
Seki et al.

(10) Patent No.: US 11,440,186 B2
(45) Date of Patent: *Sep. 13, 2022

(54) OVERSHOOT AMOUNT DETECTION METHOD, OVERSHOOT AMOUNT DETECTION SYSTEM, ROBOT SYSTEM, AND OVERSHOOT AMOUNT ADJUSTMENT METHOD

(71) Applicant: Seiko Epson Corporation, Tokyo (JP)

(72) Inventors: Ryutaro Seki, Suwa (JP); Kimitake Mizobe, Chino (JP)

(73) Assignee: Seiko Epson Corporation

( * ) Notice: Subject to any disclaimer, the term of this patent is extended or adjusted under 35 U.S.C. 154(b) by 164 days.

This patent is subject to a terminal disclaimer.

(21) Appl. No.: 16/912,811

(22) Filed: Jun. 26, 2020

(65) Prior Publication Data

US 2020/0406458 A1 Dec. 31, 2020

(30) Foreign Application Priority Data

Jun. 27, 2019 (JP) .............................. JP2019-119685

(51) Int. Cl.
*B25J 9/16* (2006.01)
*B25J 13/08* (2006.01)

(52) U.S. Cl.
CPC .......... *B25J 9/1638* (2013.01); *B25J 9/1653* (2013.01); *B25J 9/1694* (2013.01); *B25J 13/088* (2013.01)

(58) Field of Classification Search
CPC .... B25J 9/1638; B25J 13/088; B25J 19/0095; B25J 9/1653; B25J 9/1694
See application file for complete search history.

(56) References Cited

U.S. PATENT DOCUMENTS

| 2007/0288124 | A1* | 12/2007 | Nagata | B25J 13/088 |
| | | | | 901/46 |
| 2013/0278196 | A1* | 10/2013 | Tian | B25J 9/1638 |
| | | | | 318/430 |
| 2014/0309778 | A1* | 10/2014 | Asada | B25J 9/1651 |
| | | | | 700/258 |
| 2015/0246442 | A1 | 9/2015 | Cho et al. | |
| 2018/0207797 | A1 | 7/2018 | Yamaoka et al. | |
| 2019/0291279 | A1* | 9/2019 | Nakayama | G01C 25/00 |
| 2022/0016769 | A1* | 1/2022 | Seki | B25J 9/1638 |

FOREIGN PATENT DOCUMENTS

| JP | 2011-125937 A | 6/2011 |
| JP | 2018-118353 A | 8/2018 |

* cited by examiner

*Primary Examiner* — Abby Y Lin
*Assistant Examiner* — Karston G. Evans
(74) *Attorney, Agent, or Firm* — Harness, Dickey & Pierce, P.L.C.

(57) ABSTRACT

An overshoot amount detection method includes a first step of generating a first signal from a first detection signal output from an inertial sensor that detects inertia in a working unit of an arm to be displaced, a second step of generating a second signal using a second detection signal output from an encoder that detects an amount of displacement of the arm, and a third step of detecting an overshoot amount of the arm based on a third signal obtained by synthesis of the first signal and the second signal. The first step includes twice integration of the first detection signal and removing a low-frequency component contained in the first detection signal.

11 Claims, 3 Drawing Sheets

OVERSHOOT AMOUNT DETECTION METHOD, OVERSHOOT AMOUNT DETECTION SYSTEM, ROBOT SYSTEM, AND OVERSHOOT AMOUNT ADJUSTMENT METHOD

The present application is based on, and claims priority from JP Application Serial Number 2019-119685, filed Jun. 27, 2019, the disclosure of which is hereby incorporated by reference herein in its entirety.

BACKGROUND

1. Technical Field

The present disclosure relates to an overshoot amount detection method, overshoot amount detection system, robot system, and overshoot amount adjustment method.

2. Related Art

A robot control system disclosed in JP-A-2018-118353 has an acceleration sensor provided in an end effector and detects an overshoot amount from a set stop position of an arm based on a detection signal output from the acceleration sensor. Specifically, the robot control system detects a position of the arm by twice integration of an acceleration signal as the detection signal output from the acceleration sensor, and detects the maximum value of a difference between the detected position and the set stop position as the overshoot amount.

When the acceleration signal output from the acceleration sensor is integrated twice, drift occurs due to noise, and it is necessary to remove a low-frequency component signal contained in the acceleration signal from the signal when the integration is performed by filtering processing or the like. However, the low-frequency component is an important component indicating the movement of the arm, and there is a problem that, if the low-frequency component is removed, accurate detection of overshoot amount of the arm is difficult.

SUMMARY

An overshoot amount detection method according to an aspect of the present disclosure includes generating a first signal by twice integration on a first detection signal output from an inertial sensor that detects inertia in a working unit of an arm to be displaced and removal of a low-frequency component contained in the first detection signal, generating a second signal for supplement of the low-frequency component of the first signal from a second detection signal output from an encoder that detects an amount of displacement of the arm, and detecting an overshoot amount of the arm based on the first signal and the second signal.

DESCRIPTION OF EXEMPLARY EMBODIMENTS

As below, an overshoot amount detection method, overshoot amount detection system, robot system, and overshoot amount adjustment method according to the present disclosure will be explained in detail based on an embodiment shown in the accompanying drawings.

Figure 1:
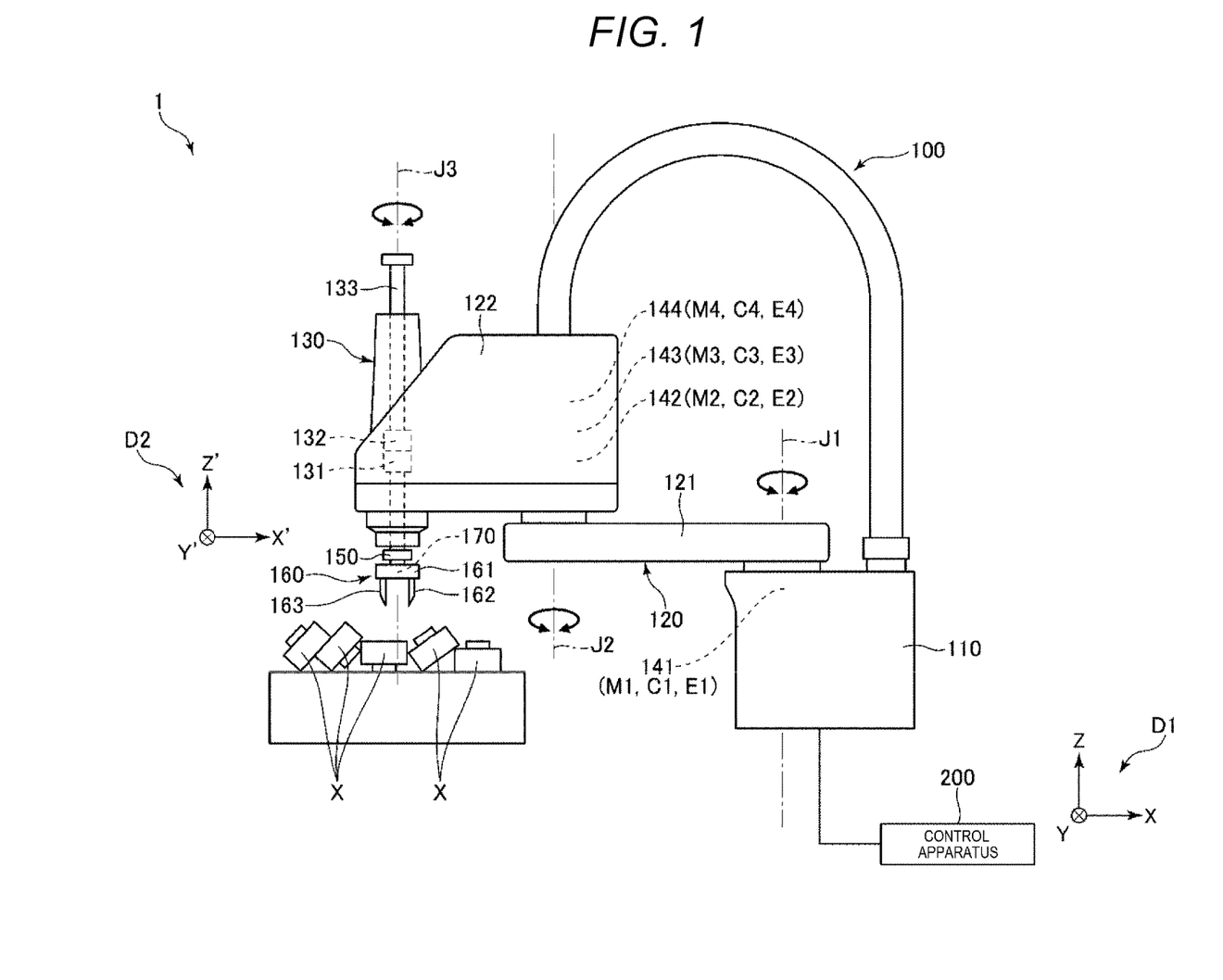
FIG. 1 shows an overall configuration of a robot system according to a preferred embodiment of the present disclosure.
Figure 2:
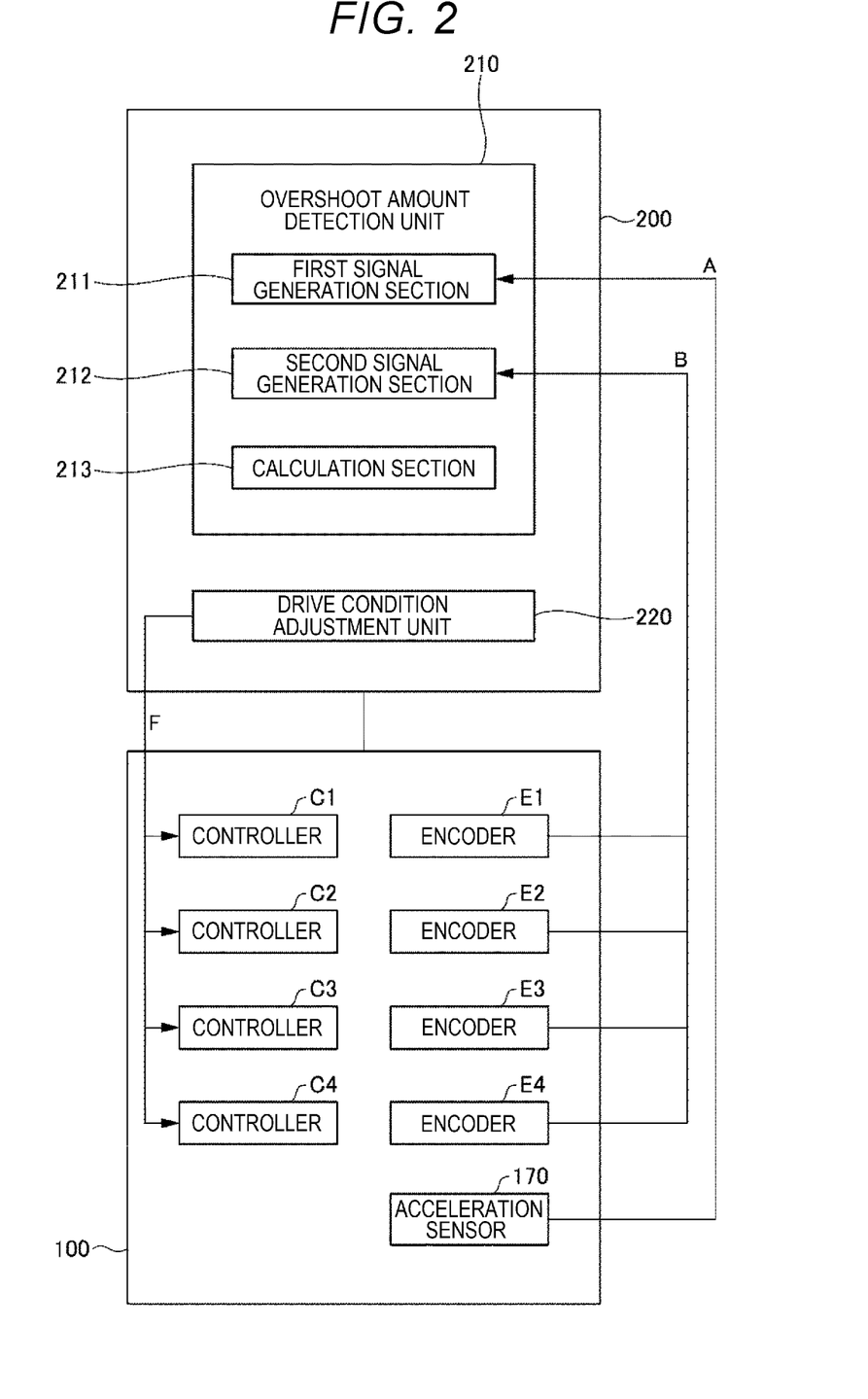
FIG. 2 is a block diagram showing a configuration of a control apparatus.
Figure 3:
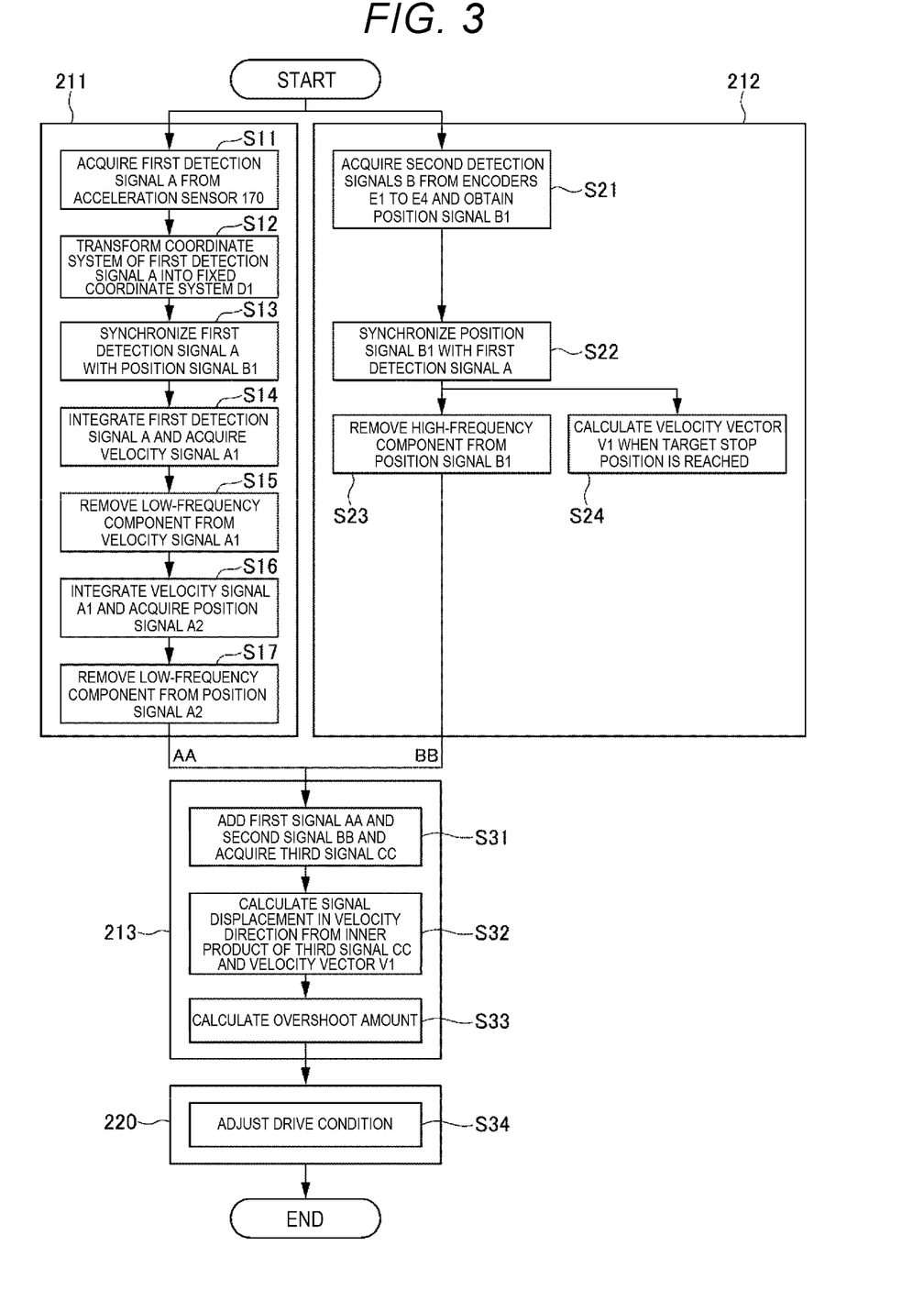
FIG. 3 is a flowchart showing a detection method of an overshoot amount.

FIG. 1 shows the overall configuration of the robot system according to the preferred embodiment of the present disclosure. FIG. 2 is the block diagram showing the configuration of the control apparatus. FIG. 3 is the flowchart showing the detection method of the overshoot amount.

A robot system 1 shown in FIG. 1 has a robot main body 100 and a control apparatus 200 that controls driving of the robot main body 100.

First, the robot main body 100 is briefly explained. As shown in FIG. 1, the robot main body 100 is a horizontal articulated robot, i.e., scalar robot and used for respective work of e.g. holding, transport, assembly, inspection, etc. of works including electronic components. Note that the usage of the robot main body 100 is not particularly limited.

The robot main body 100 has a base 110 and an arm 120 coupled to the base 110. The arm 120 has a first arm 121 with a proximal end portion coupled to the base 110 pivotable about a first axis J1 relative to the base 110, and a second arm 122 with a proximal end portion coupled to a distal end portion of the first arm 121 pivotable about a second axis J2 parallel to the first axis J1 relative to the first arm 121. Further, a working head 130 is provided in a distal end portion of the second arm 122.

The base 110 is fixed to e.g. a floor surface (not shown) by bolts or the like. Within the base 110, a driver 141 that pivots the first arm 121 about the first axis J1 along a vertical direction relative to the base 110 is provided and, within the second arm 122, a driver 142 that pivots the second arm 122 about the second axis J2 relative to the first arm 121 is provided.

The driver 141 includes a motor M1 as a drive source that pivots the first arm 121 about the first axis J1 relative to the base 110, a controller C1 that controls driving of the motor M1, an encoder E1 that detects an amount of displacement (pivot angle) of the first arm 121 about the first axis J1, etc. Similarly, the driver 142 includes a motor M2 as a drive source that pivots the second arm 122 about the second axis J2 relative to the first arm 121, a controller C2 that controls driving of the motor M2, an encoder E2 that detects an amount of displacement (pivot angle) of the second arm 122 about the second axis J2, etc.

The working head 130 has a spline nut 131 and a ball screw nut 132 coaxially placed in the distal end portion of the second arm 122, and a spline shaft 133 inserted through the spline nut 131 and the ball screw nut 132. The spline shaft 133 is a center shaft for the second arm 122, and rotatable about a third axis J3 parallel to the first and second axes J1, J2 and movable upward and downward in directions along the third axis J3.

Within the second arm 122, a driver 143 that rotates the spline shaft 133 about the third axis J3 by rotating the spline nut 131, and a driver 144 that moves the spline shaft 133 upward and downward in the directions along the third axis J3 by rotating the ball screw nut 132 are provided.

The driver 143 includes a motor M3 as a drive source that pivots the spline shaft 133 about the third axis J3 relative to the second arm 122, a controller C3 that controls driving of the motor M3, an encoder E3 that detects an amount of displacement (pivot angle) of the spline shaft 133 about the third axis J3, etc. Similarly, the driver 144 includes a motor M4 as a drive source that moves the spline shaft 133 upward and downward in the third axis J3 directions relative to the second arm 122, a controller C4 that controls driving of the motor M4, an encoder E4 that detects an amount of displacement (amount of elevation) of the spline shaft 133 in the third axis J3 directions, etc.

Here, the respective encoders E1 to E4 have a common fixed coordinate system D1. The fixed coordinate system D1 has an X-axis, a Y-axis, and a Z-axis orthogonal to one another and the X-axis and the Y-axis extend in horizontal directions and the Z-axis extends in vertical directions. The fixed coordinate system D1 is fixed relative to the base 110, and accordingly, the position thereof is fixed regardless of the displacement of the arm 120.

A payload 150 for attachment of an end effector 160 is provided in the lower end portion of the spline shaft 133. The end effector 160 attached to the payload 150 is not particularly limited as long as the end effector may perform a target operation. In the embodiment, a hand for gripping an object X is used. Note that the gripping method is not particularly limited. The hand may hold the object by a plurality of claws or suction the object by air chuck, electrostatic chuck, or the like.

The end effector 160 of the embodiment has a base portion 161 attached to the payload 150 and a pair of claw portions 162, 163 openable and closable relative to the base portion 161. The pair of claw portions 162, 163 are brought closer to each other, and thereby, may grip the object. The claw portions 162, 163 are separated from each other, and thereby, may release the gripped object. Note that the configuration of the end effector 160 is not particularly limited.

Further, the robot main body 100 has an acceleration sensor 170 as an inertial sensor provided in the base portion 161 of the end effector 160. The acceleration sensor 170 is a three-axis acceleration sensor that may respectively independently detect accelerations in three axial directions orthogonal to one another. The acceleration sensor 170 has a movable coordinate system D2. The movable coordinate system D2 has an X'-axis, a Y'-axis, and a Z'-axis orthogonal to one another and the X'-axis and the Y'-axis extend in the horizontal directions and the Z'-axis extends in the vertical directions. The movable coordinate system D2 is fixed relative to the base portion 161 and, when the base portion 161 moves or pivots in the X-axis directions, the Y-axis directions, or the Z-axis directions, moves or pivots with the motion and, when the base portion 161 rotates about the third axis J3, rotates with the motion.

As described above, the acceleration sensor 170 is used as the inertial sensor, and thereby, movement and vibration of the arm 120 may be also detected with respect to the translational directions (linear directions) without rotation. Note that the inertial sensor is not limited to the acceleration sensor 170, but e.g. an angular velocity sensor may be used. In this case, the sensor is preferably combined with a robot main body without movement or vibration of the arm 120 in the translational directions.

As above, the overall configuration of the robot main body 100 is briefly explained. Note that the configuration of the robot main body 100 is not particularly limited, but the arm 120 may have a configuration in which the first arm 121 is omitted and the second arm 122 is coupled to the base 110 or a configuration in which at least another arm rotatable about an axis parallel to the first, second axes J1, J2 further intervenes between the first arm 121 and the second arm 122. Or, not the horizontal articulated robot, but an articulated robot including a six-arm robot or dual-arm robot in which rotation axes of a plurality of arms have a skew relationship may be employed.

Within the base 110, e.g. the control apparatus 200 that controls driving of the drivers 141, 142, 143, 144 according to commands from a host computer (not shown) is provided. Note that the placement position of the control apparatus 200 is not particularly limited, but may be outside of the base 110, for example.

The control apparatus 200 includes e.g. a computer having a processor (CPU) that processes information, a memory communicably coupled to the processor, and an external interface. Further, various programs executable by the processor are stored in the memory and the processor may read and execute various programs stored in the memory etc.

As shown in FIG. 2, the control apparatus 200 has an overshoot amount detection unit 210 that detects an overshoot amount of the arm 120, and a drive condition adjustment unit 220 that adjusts a drive condition of the arm 120 based on a detection result in the overshoot amount detection unit 210. Note that the overshoot amount of the arm 120 is the maximum value of an excessive amount of the arm 120 relative to a target stop position when the arm 120 is moved to the target stop position.

The overshoot amount detection unit 210 has a function of detecting the overshoot amount of the arm 120 as described above. Specifically, the overshoot amount of the arm 120 of the embodiment refers to an overshoot amount of the base portion 161 of the end effector 160 as a working unit. The base portion 161 is provided sufficiently close to the claw portions 162, 163 that grip the object, i.e., the working unit of the robot main body 100. Accordingly, the overshoot amount of the portion is detected, and thereby, the overshoot amount in the working unit may be detected more accurately. Then, using the detection result, the trajectory of the end effector 160 may be controlled more accurately and, as a result, working accuracy and working efficiency of the robot main body 100 are respectively improved.

The overshoot amount detection unit 210 has a first signal generation section 211 that acquires a first detection signal A output from the acceleration sensor 170 and generates a first signal AA from the acquired first detection signal A, a second signal generation section 212 that acquires second detection signals B output from the respective encoders E1 to E4 and generates a second signal BB from the acquired second detection signals B, and a calculation section 213 that generates a third signal CC by adding the first signal AA and the second signal BB and calculates the overshoot amount of the arm 120 based on the third signal CC. As below, functions of the respective sections and a detection method of the overshoot amount will be explained in detail with reference to the flowchart shown in FIG. 3.

First, processing in the first signal generation section 211 is explained. As step S11, the first signal generation section 211 first acquires the first detection signal A as an acceleration signal output from the acceleration sensor 170. Then, as step S12, the first signal generation section 211 transforms the movable coordinate system D2 as the coordinate system of the first detection signal A acquired from the acceleration sensor 170 into the fixed coordinate system D1 as the coordinate system of the encoders E1 to E4. The transformation may be performed using e.g. a homogeneous transformation matrix. In this manner, the movable coordinate system D2 as the coordinate system of the first detection signal A is transformed into the fixed coordinate system D1 as the coordinate system of the encoders E1 to E4 so that the coordinate systems of the first detection signal A and the second detection signals B may coincide, and thereby, the overshoot amount of the arm 120 may be accurately calculated from the subsequent third signal CC.

Then, as step S13, the first signal generation section 211 synchronizes the first detection signal A with the second detection signals B, specifically, a position signal B1, which will be described later. Thereby, the subsequent third signal CC may be generated more accurately. The synchronization method is not particularly limited. For example, when the arm 120 is driven, rise of the first detection signal A is detected and a time of the rise is set as an action start time T1 of the arm 120, rise of the second detection signals B is detected and a time of the rise is set as an action start time T2 of the arm 120, these two action start times T1, T2 are synchronized, and thereby, the first detection signal A and the second detection signals B may be synchronized.

Then, the first signal generation section 211 integrates the first detection signal A twice and removes a low-frequency component from the first detection signal A. Specifically, as step S14, the first signal generation section 211 first integrates the first detection signal A and obtains a velocity signal A1. Then, as step S15, the first signal generation section 211 removes a low-frequency component from the velocity signal A1 using a high-pass filter or the like. Then, as step S16, the first signal generation section 211 integrates the velocity signal A1 and obtains a position signal A2. Then, as step S17, the first signal generation section 211 removes a low-frequency component from the position signal A2 using a high-pass filter or the like. Thereby, the first signal AA is obtained.

The low-frequency components removed at steps S15, S17 refer to components in lower frequency bands of the frequencies of the signals, not components having absolute frequency bands. For example, in normal actuation of the robot main body 100, the frequency band of the first detection signal A is about from 1 Hz to 100 Hz and, for example, components equal to or lower than 10 Hz are preferably used.

The low-frequency components are removed from the first detection signal A for the following reason. As described above, it is known that the velocity signal A1 is obtained by the single integration of the first detection signal A as the acceleration signal, and the position signal A2 is obtained by the twice integration. Accordingly, the position of the base portion 161 of the end effector 160 can be detected from the position signal A2. However, in the position signal obtained by twice integration of the first detection signal A, noise at lower frequencies is emphasized. Accordingly, detection of the accurate position of the base portion 161 is difficult from the position signal obtained only by twice integration of the first detection signal A.

For that reason, to remove the above described noise, it is necessary to remove the low-frequency components from the first detection signal A. Note that the timing and the number of times to remove the low-frequency components from the first detection signal A are not particularly limited. For example, one of the steps S15, S17 may be omitted. Or, the steps S15, S17 may be omitted and the low-frequency components may be removed from the first detection signal A prior to step S14 instead.

As described above, the low-frequency components are removed from the first detection signal A and the noise is removed from the position signal A2, however, the removed low-frequency components are important signals indicating the movement of the arm 120. That is, when the low-frequency components are removed from the first detection signal A, not only the noise but also the important signals indicating the movement of the arm 120 are removed. Accordingly, it is difficult to detect the accurate position of the base portion 161 of the end effector 160 even based on the position signal A2 without the low-frequency components. On this account, the second signal generation section 212 generates the second signal BB for supplement of the low-frequency components removed from the first detection signal A.

Next, processing in the second signal generation section 212 is explained. As step S21, the second signal generation section 212 first acquires the second detection signals B output from the respective encoders E1 to E4 and obtains a position signal B1 of the base portion 161 of the end effector 160 from these respective second detection signals B. Then, as step S22, the second signal generation section 212 synchronizes the position signal B1 with the first detection signal A. This step is the same step as the above described step S13. Then, as step S23, the second signal generation section 212 removes a high-frequency component from the position signal B1 using a low-pass filter or the like. Thereby, the second signal BB for supplement of the low-frequency components removed from the first signal AA is obtained.

It is preferable that, as the high-frequency component removed at step S23, the frequency band of the second signal BB contains the frequency bands removed from the first signal AA. Thereby, the low-frequency components removed from the first signal AA may be supplemented by the second signal BB. As described above, in the embodiment, the low-frequency components equal to or lower than 10 Hz are removed from the first signal AA, and it is preferable that the second signal BB contains the low-frequency component from 0 Hz to 10 Hz. In other words, at step S23, it is preferable to set the low-pass filter to remove the frequency components higher than 10 Hz.

Further, as step S24 separate from step S23, the second signal generation section 212 calculates a velocity vector V1 when the target stop position of the arm 120 is reached based on a position command from the host computer (information on the target stop position of the arm 120) and the position signal B1.

As above, the processing in the first signal generation section 211 and the second signal generation section 212 is explained to the point where the first signal AA and the second signal BB are generated. Next, processing in the calculation section 213 is explained. As step S31, the calculation section 213 first adds the first signal AA obtained in the first signal generation section 211 and the second signal BB obtained in the second signal generation section 212 and obtains the third signal CC. The third signal CC is a signal formed by supplementation of the low-frequency components of the first signal AA with the second signal BB and a synthesized signal indicating a three-dimensional movement trajectory of the base portion 161 of the end effector 160.

Then, as step S32, the calculation section 213 calculates an inner product of the velocity vector V1 and the third signal CC and calculates signal displacement in the velocity direction, i.e., the movement direction of the base portion 161. Then, as step S33, the calculation section 213 calculates an overshoot amount of the base portion 161 based on the signal displacement calculated at step S32. Specifically, the calculation section 213 calculates a peak value (maximum value) of the signal displacement as the overshoot amount of the base portion 161. Then, as step S34, the drive condition of the arm 120 is adjusted based on the overshoot amount calculated at step S33. Note that step S34 may be omitted.

As above, the robot system 1, the overshoot amount detection method realized by the robot system 1, and the overshoot amount detection system and adjustment system applied to the robot system 1 are explained.

According to the overshoot amount detection unit 210, the overshoot amount is calculated based on the third signal CC generated by addition of the second signal BB generated from the second detection signals B output from the respective encoders E1 to E4 for supplement of the low-frequency components removed from the first signal AA to the first signal AA generated from the first detection signal A output from the acceleration sensor 170 from which the low-frequency components containing higher noise is removed. Since the low-frequency component of the second signal BB contains lower noise than the low-frequency components removed from the first detection signal A, the overshoot amount of the arm 120 is calculated based on the third signal CC, and thereby, for example, compared to a case where the overshoot amount of the arm 120 is detected based on a signal obtained only by twice integration on the first detection signal A without removal of the low-frequency components as in related art, the overshoot amount of the arm 120 may be detected more accurately. Note that the noise of the low-frequency component of the second signal BB is smaller than the noise of the low-frequency components removed from the first detection signal A because the second signal BB is not subjected to integration processing like the first signal AA.

Further, according to the overshoot amount detection unit 210, the position of the base portion 161 may be calculated in consideration of both the position change of the arm 120 made by driving of the motors M1 to M4 and vibration (acceleration) generated in the base portion 161 with the change, and thus, the three-dimensional trajectory of the base portion 161 may be calculated more accurately. Only the trajectory of the base portion 161 in the traveling direction may be extracted and the overshoot amount of the base portion 161 may be accurately calculated in any traveling direction regardless of the placement orientation of the acceleration sensor 170 relative to the base portion 161. Particularly, the calculation is based on the second detection signals B output from the encoders E1 to E4, and thereby, the traveling direction of the base portion 161 may be accurately detected regardless of residual vibration when the base portion 161 is at rest.

As above, the overshoot amount detection unit 210 is explained. Next, the drive condition adjustment unit 220 is explained. The drive condition adjustment unit 220 adjusts the drive condition of the arm 120 so that the overshoot amount detected by the overshoot amount detection unit 210 may be smaller, preferably zero. The adjustable drive condition is not particularly limited to, but includes e.g. (1) an acceleration immediately after the start of driving of the arm 120, (2) a velocity of movement at a constant velocity after acceleration, i.e., the maximum velocity, (3) a position in which deceleration is started for stopping in a target position, (4) a deceleration at deceleration, etc. At least one of these condition (1) to condition (4) is appropriately adjusted and the overshoot amount is suppressed to be smaller, and thereby, the movement accuracy of the arm 120 becomes higher and the working efficiency becomes higher.

Specifically, to minimize the overshoot amount, the drive amount of at least one of the motors M1 to M4 is adjusted for execution. That is, as shown in FIG. 2, the drive condition adjustment unit 220 outputs a command signal F with addition of a correction value corresponding to the overshoot amount to the controllers C1 to C4 corresponding to the motors M1 to M4 to adjust, and adjusts the drive amounts and drive times of the corresponding motors M1 to M4. Note that the adjustment may be manually performed by a user.

As above, the robot system 1 is explained. The overshoot amount detection method used for the robot system 1 includes generating the first signal AA by twice integration on the first detection signal A output from the acceleration sensor 170 as the inertial sensor that detects the inertia, the acceleration in the embodiment in the end effector 160 as the working unit of the arm 120 and removal of the low-frequency components contained in the first detection signal A, generating the second signal BB for supplement of the low-frequency components of the first signal AA from the second detection signals B output from the encoders E1 to E4 that detect the amount of displacement of the arm 120, and detecting the overshoot amount of the arm 120 based on the first signal AA and the second signal BB as described above.

In other words, the overshoot amount detection method includes the steps S11 to S17 as a first step of generating the first signal AA from the first detection signal A output from the acceleration sensor 170 as the inertial sensor that detects the inertia, the acceleration in the embodiment in the end effector 160 as the working unit of the arm 120 to be displaced, the steps S21 to S24 as a second step of generating the second signal BB using the second detection signals B output from the encoders E1 to E4 that detect the amount of displacement of the arm 120, and the steps S31 to S33 as a third step of detecting the overshoot amount of the arm 120 based on the third signal CC formed by synthesis of the first signal AA and the second signal BB. Further, the first step includes the step of twice integration of the first detection signal A and the step of removing the low-frequency component contained in the first detection signal A.

According to the overshoot amount detection method, the overshoot amount is calculated based on the third signal CC generated by addition of the second signal BB with lower noise than that of the low-frequency component removed from the first signal AA to the first signal AA obtained by removal of the low-frequency component with higher noise. Accordingly, the overshoot amount is calculated based on the third signal CC, and thereby, for example, compared to the case where the overshoot amount is detected based on the signal obtained only by twice integration on the first detection signal A without removal of the low-frequency component as in related art, the overshoot amount may be detected more accurately.

Further, according to the overshoot amount detection method, the position of the end effector 160 may be calculated in consideration of both the position change of the arm 120 provided by the motors M1 to M4 and vibration (acceleration) generated in the base portion 161 with the change, and thus, the three-dimensional trajectory of the end effector 160 may be calculated more accurately. Only the trajectory of the end effector 160 in the traveling direction may be extracted and the overshoot amount may be accurately calculated in any traveling direction regardless of the placement orientation of the acceleration sensor 170. Particularly, the calculation is based on the second detection signals B output from the encoders E1 to E4, and thereby, the traveling direction of the end effector 160 may be accurately detected regardless of residual vibration when the end effector 160 is at rest.

As described above, at step S12, the movable coordinate system D2 as the coordinate system of the first detection signal A is coordinate-transformed into the fixed coordinate system D1 as the coordinate system of the second detection signals B. In this manner, the coordinate system of the first detection signal A is transformed into the fixed coordinate system D1 as the coordinate system of the second detection signals B so that the coordinate systems of the first detection signal A and the second detection signals B may coincide, and thereby, the overshoot amount may be accurately calculated from the third signal CC obtained by addition of these signals.

As described above, at step S13 and step S22, the first detection signal A is synchronized with the second detection signals B. Thereby, the third signal CC may be generated more accurately.

As described above, the end effector 160 is provided in the distal end portion of the arm 120. Further, the acceleration sensor 170 is provided in the distal end portion of the arm 120. Thereby, the acceleration sensor 170 may be placed near the end effector 160 as the working unit. Accordingly, the acceleration sensor 170 may detect the acceleration applied to the end effector 160 more accurately.

As described above, the acceleration sensor 170 is provided in the end effector 160. Accordingly, the acceleration sensor 170 may detect the acceleration applied to the end effector 160 more accurately.

As described above, the inertial sensor is the acceleration sensor 170. Thereby, the movement and vibration of the arm 120 in the translational directions without rotation may be detected.

As described above, the arm 120 has at least the first arm 121 pivoting about the first axis J1 and the second arm 122 pivoting about the second axis J2 relative to the first arm 121 and having the end effector 160. Further, the encoders have at least the encoder E1 as a first encoder detecting the amount of displacement of the first arm 121 about the first axis J1 and the encoder E2 as a second encoder detecting the amount of displacement of the second arm 122 about the second axis J2. At steps S21 to S24, the second signal BB is generated from at least the second detection signal B output from the encoder E1 and the second detection signal B output from the encoder E2. Thereby, the second signal BB with higher accuracy is generated.

As described above, the robot system 1 has the arm 120 to be displaced, the acceleration sensor 170 as the inertial sensor that detects the inertia, the acceleration in the embodiment in the end effector 160 as the working unit of the arm 120, the encoders E1 to E4 that detect the amount of displacement of the arm 120, and the overshoot amount detection unit 210 that generates the first signal AA by twice integration on the first detection signal A output from the acceleration sensor 170 and removal of the low-frequency components contained in the first detection signal A, generates the second signal BB for supplement of the low-frequency component of the first signal AA from the second detection signal B output from the encoder E1, and detects the overshoot amount from the target stop position of the arm 120 based on the first signal AA and the second signal BB.

As described above, an overshoot amount detection system incorporated in the robot system 1 has the acceleration sensor 170 as the inertial sensor that detects the inertia, the acceleration in the embodiment in the end effector 160 as the working unit of the arm 120 to be displaced, the encoders E1 to E4 that detect the amount of displacement of the arm 120, and the overshoot amount detection unit 210 that generates the first signal AA by twice integration on the first detection signal A output from the acceleration sensor 170 and removal of the low-frequency components contained in the first detection signal A, generates the second signal BB for supplement of the low-frequency component of the first signal AA from the second detection signal B output from the encoder E1, and detects the overshoot amount of the arm 120 based on the first signal AA and the second signal BB.

According to the robot system 1 and the overshoot amount detection system, the overshoot amount is calculated based on the third signal CC generated by addition of the second signal BB with lower noise than that of the low-frequency component removed from the first signal AA to the first signal AA obtained by removal of the low-frequency component with higher noise. Accordingly, the overshoot amount is calculated based on the third signal CC, and thereby, for example, compared to the case where the overshoot amount is detected based on the signal obtained only by twice integration on the first detection signal A without removal of the low-frequency component as in related art, the overshoot amount may be detected more accurately.

Further, according to the robot system 1 and the overshoot amount detection system, the position of the end effector 160 may be calculated in consideration of both the position change of the arm 120 provided by the motors M1 to M4 and vibration (acceleration) generated in the base portion 161 with the change, and thus, the three-dimensional trajectory of the end effector 160 may be calculated more accurately. Only the trajectory of the end effector 160 in the traveling direction may be extracted and the overshoot amount may be calculated more accurately in any traveling direction regardless of the placement orientation of the acceleration sensor 170. Particularly, the calculation is based on the second detection signals B output from the encoders E1 to E4, and thereby, the traveling direction of the end effector 160 may be accurately detected regardless of residual vibration when the end effector 160 is at rest.

As described above, the robot system 1 has the drive condition adjustment unit 220 that adjusts the drive condition of the arm 120 based on the overshoot amount detected by the overshoot amount detection unit 210. Thereby, the movement accuracy of the arm 120 becomes higher and the working efficiency becomes higher.

As described above, the overshoot amount adjustment method performed in the robot system 1 includes generating the first signal AA by twice integration on the first detection signal A output from the acceleration sensor 170 as the inertial sensor that detects the inertia, the acceleration in the embodiment in the end effector 160 as the working unit of the arm 120 to be displaced and removal of the low-frequency component contained in the first detection signal A, generating the second signal BB for supplement of the low-frequency component of the first signal AA from the second detection signals B output from the encoders E1 to E4 that detect the amount of displacement of the arm 120, detecting the overshoot amount of the arm 120 based on the first signal AA and the second signal BB, and adjusting the drive condition of the arm 120 to make the overshoot amount smaller based on the detected overshoot amount. Thereby, the movement accuracy of the arm 120 becomes higher and the working efficiency becomes higher.

As above, the overshoot amount detection method, overshoot amount detection system, robot system, and overshoot amount adjustment method according to the present disclosure are explained based on the illustrated embodiments, however, the present disclosure is not limited to those. The configurations of the respective parts may be replaced by arbitrary configurations having the same functions. Or, another arbitrary configuration may be added.

What is claimed is:

1. An overshoot amount detection method for causing a processor to execute a process, the overshoot amount detection method comprising:
a first step of generating a first signal from a first detection signal output from an inertial sensor that detects inertia in a working unit of an arm to be displaced;
a second step of generating a second signal using a second detection signal output from an encoder that detects an amount of displacement of the arm; and
a third step of detecting an overshoot amount of the arm based on a third signal obtained by synthesis of the first signal and the second signal, wherein
the first step includes twice integration of the first detection signal and removing a low-frequency component contained in the first detection signal,
the second step includes calculation of a velocity vector of the arm based on the second detection signal and information of a target stop position of the arm,
the third step includes calculation of an inner product of the third signal and the velocity vector and calculation of a signal displacement in a velocity direction with respect to the velocity vector, and
the overshoot amount is obtained based on the signal displacement.

2. The method according to claim 1, wherein
at the first step, a coordinate system of the first detection signal is coordinate-transformed into a coordinate system of the second detection signal.

3. The method according to claim 1, wherein
at the first step and the second step, the first detection signal and the second detection signal are synchronized.

4. The method according to claim 1, wherein
the working unit is provided in a distal end portion of the arm, and
the inertial sensor is provided in the distal end portion of the arm.

5. The method according to claim 1, wherein
the inertial sensor is provided in the working unit.

6. The method according to claim 1, wherein
the inertial sensor is an acceleration sensor.

7. The method according to claim 1, wherein
the arm has a first arm pivoting about a first axis and a second arm pivoting about a second axis relative to the first arm and having the working unit,
the encoder includes a first encoder detecting an amount of displacement of the first arm about the first axis and a second encoder detecting an amount of displacement of the second arm about the second axis, and
at the second step, the second signal is generated from the second detection signal output from the first encoder and the second detection signal output from the second encoder.

8. An overshoot amount detection system comprising:
an inertial sensor configured to detect inertia in a working unit of an arm to be displaced;
an encoder configured to detect an amount of displacement of the arm;
a memory configured to store a program; and
a processor configured to execute the program so at to:
generate a first signal by twice integration on a first detection signal output from the inertial sensor and removal of a low-frequency component contained in the first detection signal;
generate a second signal for supplement of the low-frequency component of the first signal from a second detection signal output from the encoder; and
detect an overshoot amount of the arm based on the first signal and the second signal,
wherein the processor is further configured to:
calculate a velocity vector of the arm based on the second detection signal and information of a target stop position of the arm;
obtain a third signal by synthesis of the first signal and the second signal; and
calculate an inner product of the third signal and the velocity vector and calculate a signal displacement in a velocity direction with respect to the velocity vector, and
the overshoot amount is obtained based on the signal displacement.

9. A robot system comprising:
an arm to be displaced;
an inertial sensor configured to detect inertia in a working unit of the arm;
an encoder configured to detect an amount of displacement of the arm;
a memory configured to store a program; and
a processor configured to execute the program so as to:
generate a first signal by twice integration on a first detection signal output from the inertial sensor and removal of a low-frequency component contained in the first detection signal;
generate a second signal for supplement of the low-frequency component of the first signal from a second detection signal output from the encoder; and
detect an overshoot amount from a target stop position of the arm based on the first signal and the second signal,
wherein the processor is further configured to:
calculate a velocity vector of the arm based on the second detection signal and information of a target stop position of the arm;
obtain a third signal by synthesis of the first signal and the second signal; and
calculate an inner product of the third signal and the velocity vector and calculate a signal displacement in a velocity direction with respect to the velocity vector, and
the overshoot amount is obtained based on the signal displacement.

10. The robot system according to claim 9,
wherein the processor is configured to adjust a drive condition of the arm based on the overshoot amount.

11. An overshoot amount adjustment method for causing a processor to execute a process, the overshoot amount detection method comprising executing on the processor the steps of:
generating a first signal by twice integration on a first detection signal output from an inertial sensor that detects inertia in a working unit of an arm to be displaced and removal of a low-frequency component contained in the first detection signal;
generating a second signal for supplement of the low-frequency component of the first signal from a second detection signal output from an encoder that detects an amount of displacement of the arm;
detecting an overshoot amount of the arm based on the first signal and the second signal; and adjusting a drive condition of the arm to make an actual overshoot amount smaller than the detected overshoot amount, wherein the processor is further configured to:

calculate a velocity vector of the arm based on the second detection signal and information of a target stop position of the arm;

obtain a third signal by synthesis of the first signal and the second signal; and calculate an inner product of the third signal and the velocity vector and calculate a signal displacement in a velocity direction with respect to the velocity vector, and the overshoot amount is obtained based on the signal displacement.

* * * * *